US009482300B2

(12) United States Patent
Walther et al.

(10) Patent No.: US 9,482,300 B2
(45) Date of Patent: Nov. 1, 2016

(54) AXLE-MOUNTED BRAKE DISC WITH A CONNECTING ELEMENT

(71) Applicant: KNORR-BREMSE SYSTEME FÜR SCHIENENFAHRZEUGE GMBH, Munich (DE)

(72) Inventors: Florian Walther, Munich (DE); Christian Mosbach, Alling (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/439,848

(22) PCT Filed: Oct. 30, 2013

(86) PCT No.: PCT/EP2013/003262
§ 371 (c)(1),
(2) Date: Apr. 30, 2015

(87) PCT Pub. No.: WO2014/067655
PCT Pub. Date: May 8, 2014

(65) Prior Publication Data
US 2015/0292579 A1    Oct. 15, 2015

(30) Foreign Application Priority Data

Oct. 31, 2012    (DE) .......................... 10 2012 110 454

(51) Int. Cl.
*F16D 65/12*    (2006.01)
*F16D 65/02*    (2006.01)

(52) U.S. Cl.
CPC ........... *F16D 65/124* (2013.01); *F16D 65/123* (2013.01); *F16D 2065/136* (2013.01); *F16D 2065/1316* (2013.01); *F16D 2065/1392* (2013.01)

(58) Field of Classification Search
CPC .. F16D 65/123; F16D 65/124; F16D 65/827; F16D 2065/1392; F16D 2065/1384; F16D 2065/1316; F16D 2065/136

USPC ................... 188/17, 18 A, 218 XL
See application file for complete search history.

(56) References Cited

U.S. PATENT DOCUMENTS 2,423,056 A * 6/1947 Tarbox ................. F16D 65/123
188/218 XL
2,765,881 A * 10/1956 Pierce ................... F16D 65/123
188/218 A (Continued)

FOREIGN PATENT DOCUMENTS

CN    101945788 A    1/2011
CN    102099596 A    6/2011

(Continued)

OTHER PUBLICATIONS

Written Opinion of the International Search Authority and International Search Report for International Patent Application No. PCT/EP2013/003262 dated Oct. 31, 2013.

(Continued)

*Primary Examiner* — Melanie Torres Williams
(74) *Attorney, Agent, or Firm* — Barnes & Thornburg LLP

(57) ABSTRACT

A connection for an axle-mounted brake disc in a rail vehicle with a connecting element on the coach side, such as a hub, wherein the axle-mounted brake disc has a friction ring and a flange formed on the inner circumference of the friction ring, which flange is fastened to the connecting element. The connection has tabs made from metal sheet distributed around the circumference connected to the flange and the connecting element.

10 Claims, 3 Drawing Sheets

(56) References Cited

U.S. PATENT DOCUMENTS

| | | |
|---|---|---|
| 4,501,346 A | 2/1985 | Bogenschutz |
| 5,109,960 A * | 5/1992 | Gunther ................ F16D 65/123 188/218 XL |
| 8,763,768 B2 | 7/2014 | Lathwesen |

FOREIGN PATENT DOCUMENTS

| | | |
|---|---|---|
| DE | 7134524 U | 12/1971 |
| DE | 2806028 A1 | 8/1979 |
| DE | 3814614 A1 | 11/1989 |
| DE | 19738881 A1 | 3/1999 |
| DE | 29902180 U1 | 6/2000 |
| DE | 10324816 A1 | 1/2004 |
| DE | 102005060440 A1 | 4/2007 |
| DE | 102008054397 A1 | 6/2010 |
| GB | 2090636 A * | 7/1982 ........... F16D 65/123 |

OTHER PUBLICATIONS

Search Report for German Patent Application No. 10 2012 110 454.9; Jul. 31, 2013.

Search Report for International Patent Application No. PCT/EP2013/003262; Feb. 11, 2014.

Chinese Office Action for Chinese Application No. 201380065893.1, dated Aug. 1, 2016.

* cited by examiner

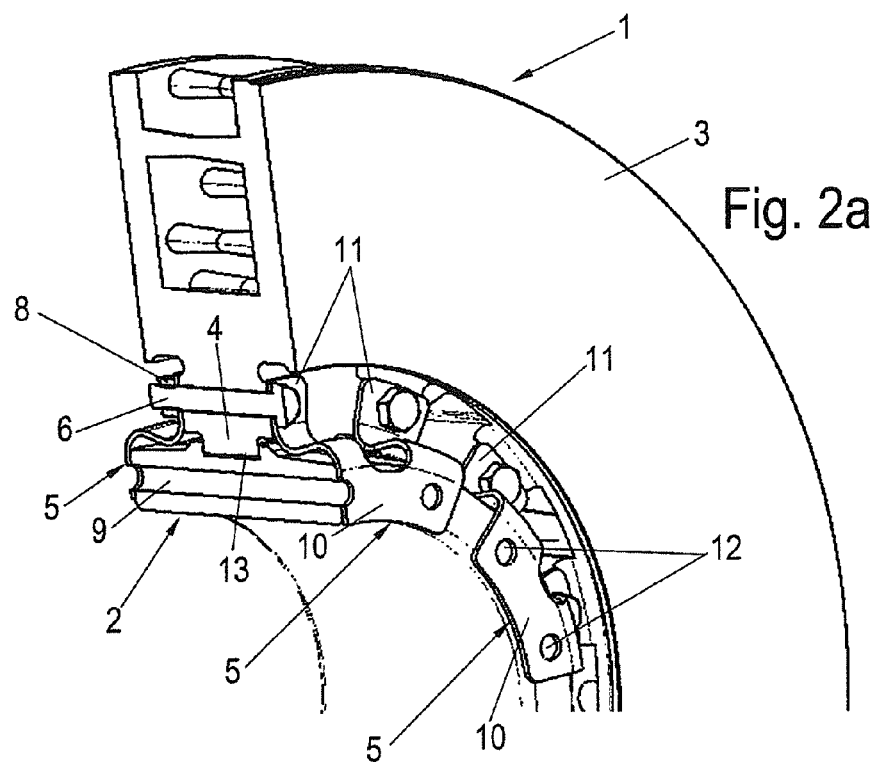
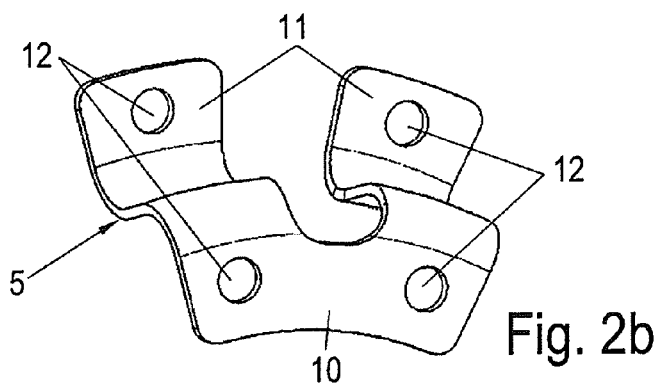

AXLE-MOUNTED BRAKE DISC WITH A CONNECTING ELEMENT

PRIORITY CLAIM

This patent application is a U.S. National Phase of International Patent Application No. PCT/EP2013/003262, filed 30 Oct. 2013, which claims priority to German Patent Application No. 10 2012 110 454.9, filed 31 Oct. 2012, the disclosures of which are incorporated herein by reference in their entirety.

FIELD

Disclosed embodiments relate to a connection for an axle-mounted brake disk in a rail vehicle, having a connecting element on the coach side.

BRIEF DESCRIPTION OF THE FIGURES

Illustrative embodiments are described below with reference to the attached drawings, in which:

FIGS. 1a, 1b, 2a, and 2b each show an illustrative embodiment as a partial section of the connection or as a detail of the connection.

DETAILED DESCRIPTION OF THE DISCLOSED EMBODIMENTS

Figure 1A:
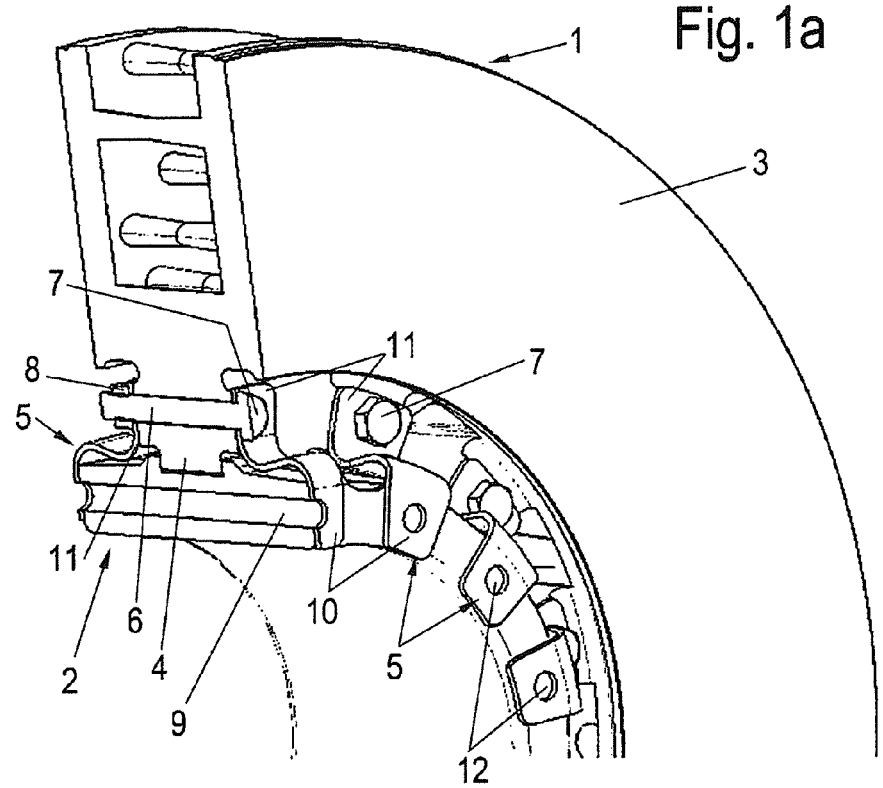

As has surprisingly been found, a relative movement between the axle-mounted brake disk and the connecting element is prevented in an effective manner, while thermal expansion of the friction ring in the elastic range due to operation is compensated by the tabs, in a manner similar to a monobloc brake disk.

In this case, the tabs, the number of which may correspond to a prime number, are designed in such a way that the braking torque can be transmitted without problems to the extent to which it arises, wherein the tabs are oriented in such a way that the circumferential force is transmitted from the friction ring to the hub with the area of their maximum second moment of area.

According to at least one disclosed embodiment, the tabs are offset in an S shape, with two limbs angled in opposite directions, one of which rests on the flange and the other on the connecting element and each of which is fastened with a screw. Here, a through hole, through which the screw is passed, is introduced into the respective limb.

According to another disclosed embodiment, provision is made to fasten tabs to both sides of the flange and to the associated regions of the connecting element.

In principle, the tabs act as spring elements in a radial direction owing to the intrinsic elasticity of the material so as to be able to compensate the radial thermal expansion of the friction ring without problems.

This is also the case if two tabs are combined into a unit to the extent that two adjacent limbs are formed in one piece, while the other two adjacent limbs are materially separate from one another.

It is expedient if the limbs associated with the connecting element are in one piece and those associated with the flange are, so to speak, in two pieces. However, a reverse arrangement is also possible, i.e. the one-piece limbs are held on the flange and the two-piece limbs are held on the connecting element.

In the same vein, it is also possible to form a connection in which the mutually adjacent limbs of the tabs on one side are in one piece overall and, to this extent, form a ring, while the respectively associated adjacent limbs aligned radially with respect thereto are materially separated.

If use is made of a clamping ring, in which the flange engages positively for axial retention, fastening screws are passed through the tab limbs associated with the clamping ring and likewise through the clamping ring itself, the springs being screwed into threads provided on the end face of a hub or passed through through holes and screwed tight. This gives a particularly long clamping length.

In contrast, the tab limbs resting on both sides of the flange are held by a cap screw which, on the one hand, rests by means of its head on the associated limbs of the tabs and likewise, on the other hand, by means of a nut screwed onto the screw passed through it, which may be held in a manner secured against rotation.

To limit possible relative movements of the friction ring in an axial direction with respect to the hub, a connection can be provided between both by means of a bayonet-type joint.

It should furthermore be noted that the novel connection can be produced extremely cheaply since the tabs can be manufactured as simple stampings, bent parts or deep drawn parts, in any of the disclosed embodiments, that is to say both as single or multiple parts or as a ring.

Since axle-mounted brake disks are series-produced parts, which are produced in large numbers, simplicity of production of the kind that the disclosed embodiments make possible is particularly important.

The possibility of being able to reuse the tabs when the axle-mounted brake disk is replaced for operational reasons should also be viewed in this light.

FIGS. 1a and 2a each show the connection of an axle-mounted brake disk 1 in a rail vehicle to a connecting element on the coach side (i.e., a hub 2), which can be connected to an axle (not shown) of a rail vehicle.

The axle-mounted brake disk 1 comprises a friction ring 3 and a flange 4, which is formed on the inner circumference and rests in a circumferential groove 13 in the hub 2 to secure the axle-mounted brake disk 1 axially.

Figure 1B:
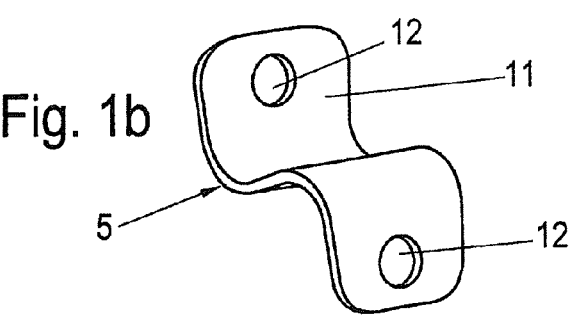

To connect the axle-mounted brake disk 1 to the hub 2, tabs 5 consisting of metal sheet are provided on both sides, and, as is shown particularly clearly by FIGS. 1b and 2b, these are bent in an S shape with two oppositely angled limbs 10, 11 aligned parallel to one another, wherein each limb 11 rests on the flange 4 and each limb 10 rests on the end face of the hub 2.

The tabs 5 are connected to the flange 4 by means of through bolts 6, with a head 7 resting on limb 11 and a nut 8 screwed onto the other end, which rests on limb 11 of the tab 5 situated there.

The tabs 5 are fastened to the hub 2 in a similar way, for which purpose axially aligned through holes, through which screws (not shown) can be passed and which can be screwed into the end face of the hub 2 on the other side, for example, are provided for this purpose in the hub 2.

In the example shown in FIG. 1, the tabs are of individual design, i.e. each tab 5 has a limb 10 resting on the hub 2 and a limb 11 resting on the flange 4. Here, holes 12 introduced into the limbs 10, 11, through which screws 6 and screws (not shown) passed through the hub 2 are inserted or can be inserted or can be screwed in from both sides.

In the disclosed embodiment of the connection, which is shown in FIG. 2, the tab 5 is configured in such a way that the limbs 10 resting on the hub 2 are in one piece, while the limbs 11 angled relative thereto, which rest on the flange 4, are configured separately from one another with a certain spacing relative to one another. Thus use is made in virtually all cases of paired tabs 5, FIG. 2*b*, showing such a pair of tabs 5 as a detail.

Figure 3:
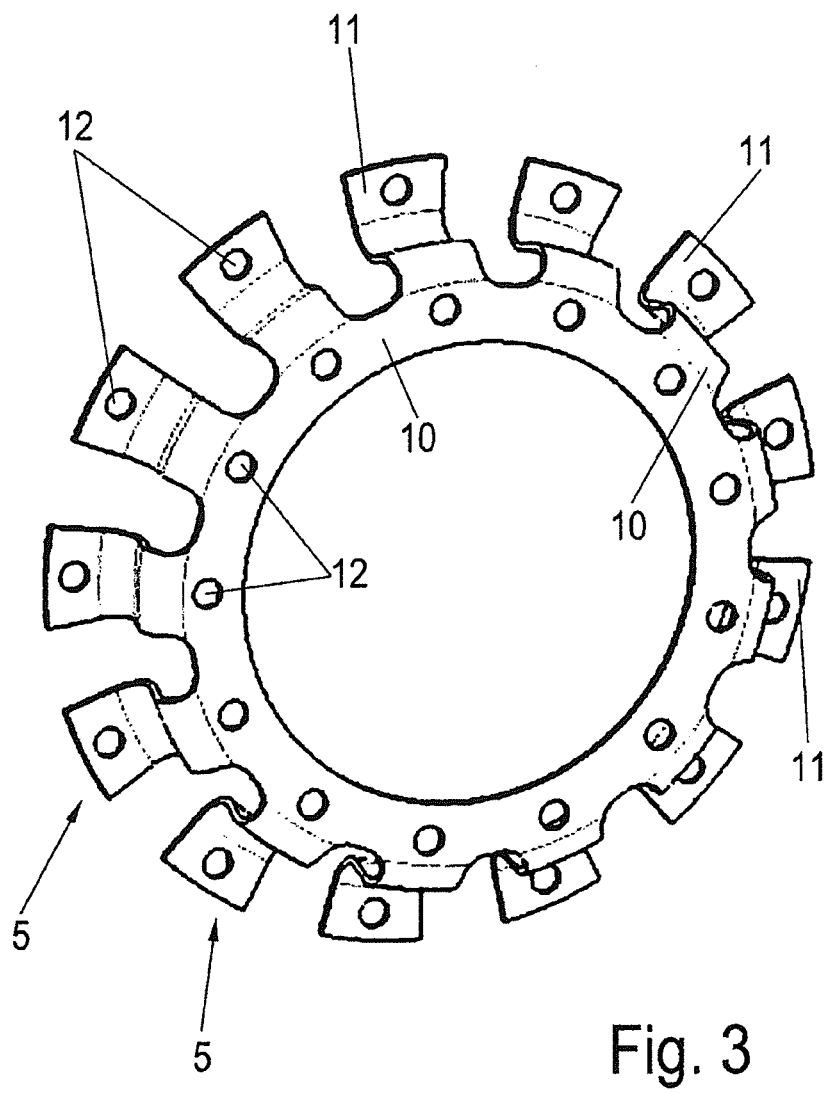
FIG. 3 shows another illustrative embodiment of the connection in a plan view.

Finally, in FIG. 3, the limbs 10 of all the tabs 5 are shaped to form a one-piece inner ring, which is adjoined by the limbs 11, which, here too, are separate from the adjacent limbs and aligned radially outward. Each of the limbs 10, 11 has a hole 12, and two radially opposite holes are aligned with one another in all cases.

The number of holes 12 associated with the flange 4 and hence the number of screws passed through can differ from the number of holes 12 associated with the hub 2.

As is very clearly apparent, the tabs 5 can be produced as simple bent stampings from metal sheet, irrespective of whether they are individual parts (FIG. 1*b*), pairs (FIG. 2*b*) or rings (FIG. 3).

DE 38 14 614 A1 discloses a connection of the type in question in which connection flanges are arranged on the inner circumference of the friction ring to fasten the friction ring on a hub or shaft of a rail vehicle, the connection flanges extending radially inward and being connected to the hub by screws, wherein the screws are passed through the connection flanges.

In the case of a connection which forms the subject matter of DE 103 24 816 A1, two mutually opposite clamping rings are provided, between which a small collar on the hub is clamped and which engage positively in the friction ring. The connection between the two clamping rings is accomplished by means of screws, which are passed through the small collar on the hub.

During operation, however, there is often loosening of the screw fastening, with a high risk of failure of the screwed joint. One possible reason for this is wear at the interfaces of the screw fastening and a resulting set in the screwed joint. Another conceivable reason is the effect of external force excitation of the kind which can occur through superposition of the natural frequencies of the brake disk and of the rail or of a truck.

Of course, this is not acceptable, particularly for safety-related reasons.

A connection of the type in question is known from DE 28 06 028 A1, in which the tabs are of hoop-shaped design and, in the case of individual arrangement, are fastened in a tangentially aligned manner to the flange, on the one hand, and to a hub, on the other. To transmit circumferential forces, a spring plate screwed on at one side is arranged between the tabs, partially covering a gap at the transition between the flange and the hub.

In another disclosed embodiment, spring plates are provided which each have two tabs arranged spaced apart from one another, between which is press-fitted another spring plate, which is connected to the flange, while the other spring plate is connected to the hub.

DE 71 34 524 U shows and describes a connection in which a sheet-metal ring is connected to the hub and adjoining which there are bent extensions, which are connected to the flange.

Finally, U.S. Pat. No. 4,501,346 A discloses connection of the flange to the hub by means of individual spring tabs, which are bent in a Z shape, one limb of which is connected to the hub and the other of which is connected to the flange.

Disclosed embodiments develop a connection of the type in question in such a way that the operational reliability thereof is improved and the service life thereof is increased.

The invention claimed is:

1. A connection for an axle-mounted brake disk in a rail vehicle having a hub on a coach side, wherein the axle-mounted brake disk has a friction ring and a flange, which is formed on the inner circumference of said friction ring and is fastened to the hub, the connection comprising:
   a plurality of tabs formed from metal sheet distributed around the circumference and connected on both sides to the flange and the hub,
   wherein the tabs are of S shaped design, with two limbs aligned in opposite directions, one of which rests on the flange and the other on the hub,
   wherein at least two adjacent limbs are formed in one piece, while the mutually adjacent limbs which each form a S shaped radial continuation thereof are separate from one another.

2. The connection of claim 1, wherein the tabs are held on the flange and on the hub by connection elements comprising at least one of screws, rivets or pins.

3. The connection of claim 2, wherein the number of connection elements on the hub is different from the number of connection elements on the flange.

4. The connection of claim 1, wherein all circumferentially adjacent limbs form a closed ring, while the mutually adjacent limbs which form a radial continuation thereof are separate from one another.

5. The connection of claim 2, wherein each limb has a hole for passing through the connection elements.

6. The connection of claim 1, wherein the tabs are bent stampings.

7. The connection of claim 1, wherein the flange rests in an axially secured manner in a circumferential groove in the hub.

8. The connection of claim 1, wherein the axle-mounted brake disk and the hub have locking means which interengage bayonet-fashion.

9. The connection of claim 1, wherein the number of tab limbs corresponds to a prime number.

10. The connection of claim 1, wherein the tabs are oriented so that the tabs transmit the circumferential force induced by braking from the friction ring to the hub with the area of their maximum second moment of area.

* * * * *